US012568399B2

(12) United States Patent
Akl et al.

(10) Patent No.: US 12,568,399 B2
(45) Date of Patent: Mar. 3, 2026

(54) EXTENSION OF UPLINK MAPPING IN INTEGRATED ACCESS AND BACKHAUL FOR CONSUMER PREMISES EQUIPMENT

(71) Applicant: QUALCOMM Incorporated, San Diego, CA (US)

(72) Inventors: Naeem Akl, Somerville, NJ (US); Karl Georg Hampel, Hoboken, NJ (US); Luis Fernando Brisson Lopes, Swindon (GB); Ozcan Ozturk, San Diego, CA (US); Sebastian Speicher, Wallisellen (CH); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 17/516,221

(22) Filed: Nov. 1, 2021

(65) Prior Publication Data

US 2023/0140587 A1 May 4, 2023

(51) Int. Cl.
| | |
|---|---|
| *H04W 72/04* | (2023.01) |
| *H04W 28/02* | (2009.01) |
| *H04W 28/08* | (2023.01) |
| *H04W 72/1268* | (2023.01) |
| *H04W 72/20* | (2023.01) |

(52) U.S. Cl.
CPC ... *H04W 28/0967* (2020.05); *H04W 28/0268* (2013.01); *H04W 72/1268* (2013.01); *H04W 72/20* (2023.01)

(58) Field of Classification Search
None
See application file for complete search history.

(56) References Cited

U.S. PATENT DOCUMENTS

2021/0051512 A1 2/2021 Hampel et al.

FOREIGN PATENT DOCUMENTS

WO WO-2022025736 A1 * 2/2022

OTHER PUBLICATIONS

Samsung, UL mapping configuration , 3GPP TSG-RAN WG3 Meeting #105bis, R3-194992, p. 1-3 (Year: 2019).*
International Search Report and Written Opinion—PCT/US2022/ 077581—ISA/EPO—Jan. 5, 2023.

(Continued)

*Primary Examiner* — Kouroush Mohebbi
(74) *Attorney, Agent, or Firm* — ArentFox Schiff, LLP

(57) ABSTRACT

Example implementations include a method, apparatus, and computer-readable medium of wireless communication for backhaul transport of non-F1 traffic between an integrated access and backhaul (IAB) node and a. IAB-donor-central unit (CU). The IAB-node may have a connection with the IAB-donor-CU. The IAB-node may provide the IAB-donor-CU with an indication of a non-F1 type of traffic for backhauling between the IAB-node and the IAB-donor-central unit. The IAB-node may receive, from the IAB-donor-CU, a configuration that maps the non-F1 type of traffic to an uplink transport channel at the IAB-node. The IAB-node may transmit uplink non-F1 traffic to the IAB-donor-CU over the uplink transport channel based on the configuration.

30 Claims, 14 Drawing Sheets

(56) References Cited

OTHER PUBLICATIONS

Samsung: "Discussion on Inter-donor IAB Node Migration Procedure for Rel-17 eIAB", 3GPP TSG-RAN WG3 Meeting #112e, R3-211940, 3rd Generation Partnership Project, Mobile Competence Centre, 650, Route Des Lucioles. F-06921 Sophia-Antipolis Cedex, France, vol. RAN WG3, No. Online, May 17, 2021-May 27, 2021, May 7, 2021, 11 Pages, XP052002189, p. 5, line 6-23.

Samsung: "UL Mapping Configuration", 3GPP TSG-RAN WG3 Meeting #105bis, R3-194992, 3rd Generation Partnership Project, Mobile Competence Centre, 650, Route Des Lucioles, F-06921 Sophia-Antipolis Cedex, France, vol. RAN WG3, No. Chongqing, China, Oct. 14, 2019-Oct. 18, 2019, Oct. 4, 2019, 4 Pages, XP051809589, p. 1, line 1—p. 2, line 22.

* cited by examiner

1400

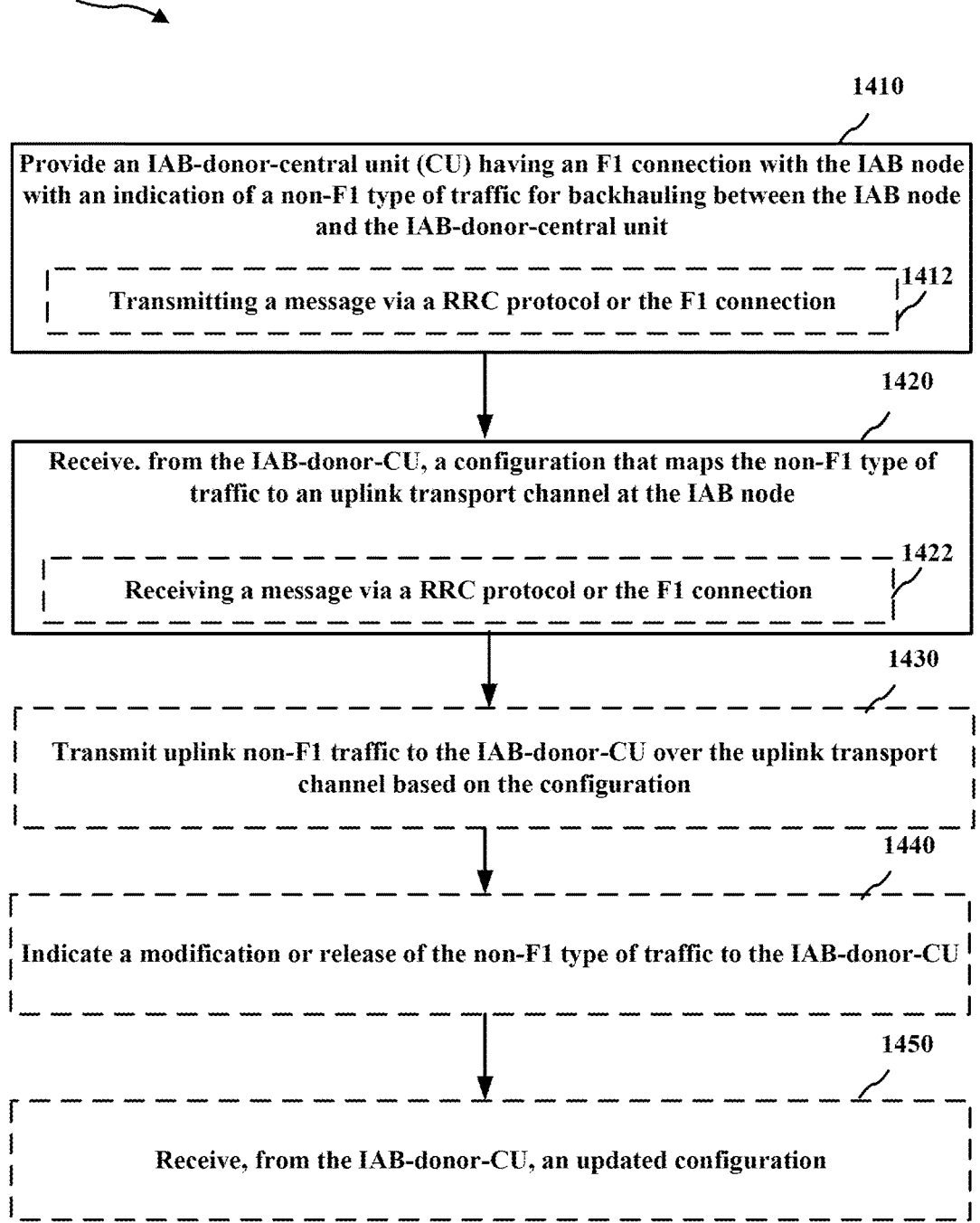

1410

Provide an IAB-donor-central unit (CU) having an F1 connection with the IAB node with an indication of a non-F1 type of traffic for backhauling between the IAB node and the IAB-donor-central unit Transmitting a message via a RRC protocol or the F1 connection    1412

1420

Receive. from the IAB-donor-CU, a configuration that maps the non-F1 type of traffic to an uplink transport channel at the IAB node Receiving a message via a RRC protocol or the F1 connection    1422

1430

Transmit uplink non-F1 traffic to the IAB-donor-CU over the uplink transport channel based on the configuration

1440

Indicate a modification or release of the non-F1 type of traffic to the IAB-donor-CU

1450

Receive, from the IAB-donor-CU, an updated configuration

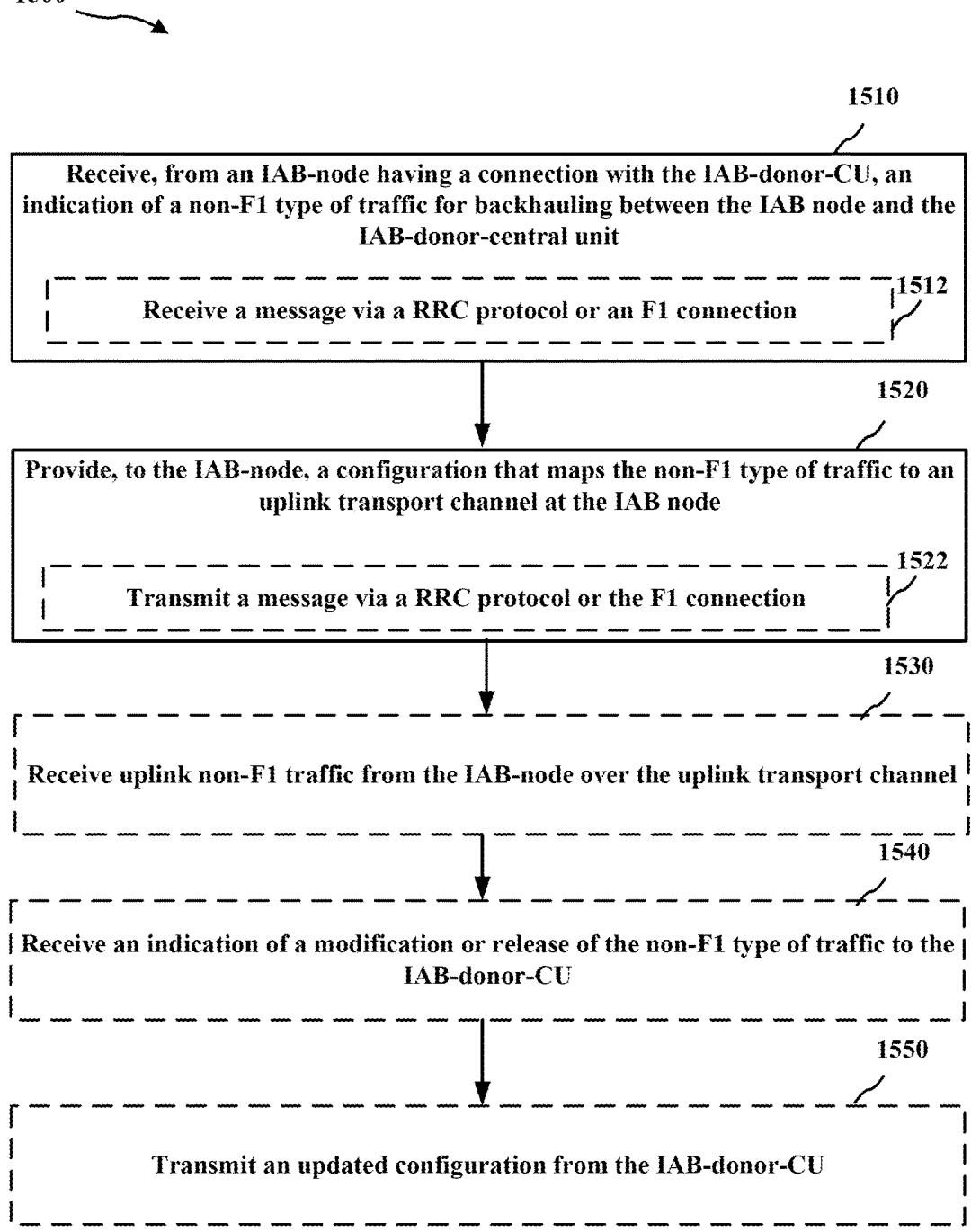

1510

Receive, from an IAB-node having a connection with the IAB-donor-CU, an indication of a non-F1 type of traffic for backhauling between the IAB node and the IAB-donor-central unit

1512

Receive a message via a RRC protocol or an F1 connection

1520

Provide, to the IAB-node, a configuration that maps the non-F1 type of traffic to an uplink transport channel at the IAB node

1522

Transmit a message via a RRC protocol or the F1 connection

1530

Receive uplink non-F1 traffic from the IAB-node over the uplink transport channel

1540

Receive an indication of a modification or release of the non-F1 type of traffic to the IAB-donor-CU

1550

Transmit an updated configuration from the IAB-donor-CU

FIG. 15

EXTENSION OF UPLINK MAPPING IN INTEGRATED ACCESS AND BACKHAUL FOR CONSUMER PREMISES EQUIPMENT

BACKGROUND

Technical Field

The present disclosure relates generally to communication systems, and more particularly, to apparatus and methods of extension of uplink mapping in integrated access and backhaul (TAB) for consumer premises equipment (CPE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure provides a method, apparatus, and non-transitory computer readable medium for backhaul transport of non-F1 traffic. The method may include providing an IAB-donor-central unit (CU) having a connection with the IAB-node with an indication of a non-F1 type of traffic for backhauling between the IAB-node and the IAB-donor-central unit. The method may include receiving, from the IAB-donor-CU, a configuration that maps the non-F1 type of traffic to an uplink transport channel at the IAB-node.

The disclosure also provides an apparatus (e.g., a base station as the IAB-node) including a memory storing computer-executable instructions and at least one processor configured to execute the computer-executable instructions to perform the above method, an apparatus including means for performing the above method, and a computer-readable medium storing computer-executable instructions for performing the above method.

In another aspect, the present disclosure provides a method, apparatus, and non-transitory computer readable medium for controlling uplink transmission of non-F1 traffic. The method may include receiving, from an IAB-node having an F1 connection with the IAB-donor-CU, an indication of a non-F1 type of traffic for backhauling between the IAB-node and the IAB-donor-central unit. The method may include providing, to the IAB-node, a configuration that maps the non-F1 type of traffic to an uplink transport channel at the IAB-node.

The disclosure also provides an apparatus (e.g., a base station as the IAB-donor) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a flowchart of an example method for backhaul transport of non-F1 traffic.

FIG. 15 is a flowchart of an example method for controlling uplink transmission of non-F1 traffic.

DETAILED DESCRIPTION

Figure 1:
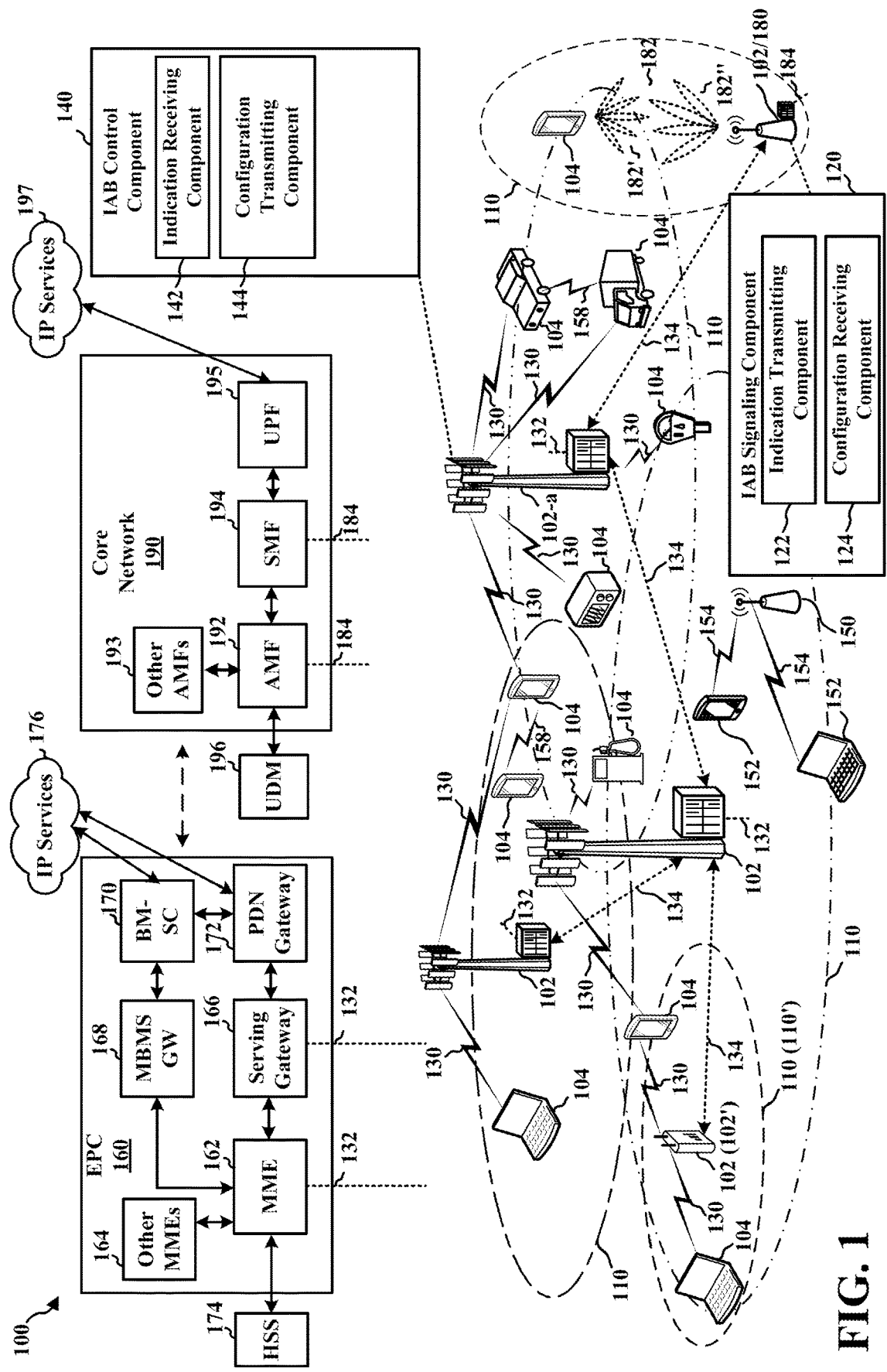
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A customer premises equipment (CPE) may utilize a wireless access link between a base station and the CPE. The CPE may serve as a base station for UEs at the customer premise (e.g., a home or business). Proposed deployment scenarios for CPE may involve various control plane signaling between the CPE and various network nodes. For example, Xn signaling between the local gNB of the CPE and a macro gNB may support mobility and/or multiplexing of radio resources for in-band operation. As another example, NG-C signaling between the local gNB and a next generation core (NGC) for the UE may support UE non-access stratum (NAS) signaling. As another example, local breakout traffic (e.g., between two UEs connected to the CPE) may utilize E1 signaling between a central unit (CU)-user plane (CU-UP) and CU-control plane (CP). The CU-UP may be local at the CPE node and the CU-CP may be located at a macro base station or IAB-donor. In some implementations, local breakout traffic may utilize N4 signaling between a local user plane function (UPF) and the NGC for the UE.

One proposed architecture to support CPE is an integrated access and backhaul (IAB) network that utilizes over the air (OTA) resources for both access for user equipment (UE) and backhaul between network entities such as base stations and a core network. For example, a network entity with a wireline connection to a core network may be referred to as an IAB-donor CU, which may communicate with an IAB distributed unit (DU) located at an IAB-node. The IAB-node may include a mobile terminal (MT) section to support a wireless connection between the CU and DU. For example, an RRC connection may connect an IAB-MT of the IAB-node with an IAB-donor-CU. The backhaul link between the IAB-DU and the IAB-donor CU may be referred to as an F1 connection and include one or more wireless links. The IAB network may utilize protocol stacks that provide security and quality of service (QoS) for the F1 connection over the wireless links. For example, a backhaul adaptation protocol (BAP) may assign upper layer traffic to backhaul radio link control (RLC) channels. For instance, the upper layer traffic may be divided into F1 user plane traffic (e.g., F1-U, X2-U: GTP-U tunnel), F1 control plane traffic (F1-C), and Non-F1 traffic. Although the above examples of control plane signaling (e.g., Xn, NG-C, E1, and N4) involve communications with a core network or IAB-donor CU, the signaling may be considered non-F1 traffic. As such, the BAP may assign RLC routing and/or channels based on a lowest priority class of traffic.

Another proposed architecture to support CPE is back-to-back arrangement of UEs and gNBs. For example, the CPE may include both a gNB that serves UEs and a UE that connects to a macro base station. In some implementations, the connection between the UE of the CPE and the macro base station may be referred to as fixed wireless access (FWA). To distinguish between the UE within the CPE and the UEs served by the CPE, the UE within the CPE may be referred to as an FWA-UE, and the macro base station may be referred to as a FWA-gNB. The second architecture may present similar issues for non-F1 traffic. That is, existing traffic types may not adequately characterize non-F1 signaling to provide QoS or priority over a wireless link.

In an aspect, the present disclosure provides for prioritization and QoS control for non-F1 traffic over wireless backhaul links in an IAB network. An IAB-node may provide an IAB-donor-central unit (CU) having a connection (e.g., an F1 connection and/or radio resource control (RRC) connection) with the IAB-node with an indication of a non-F1 type of traffic for backhauling between the IAB-node and the IAB-donor-central unit. The IAB-node may receive, from the IAB-donor-CU, a configuration that maps the non-F1 type of traffic to an uplink transport channel at the IAB-node. Accordingly, the non-F1 type of traffic (e.g., control plane signaling) may receive appropriate routing and QoS.

Although present disclosure may be focused on 5G implementations as examples, the various aspects of the present document may, for example, be applicable to subsequent variations and implementations such as, for example, 5G Advanced, 6G, and the like. Some implementations may be applicable to other similar areas, such as LTE, LTE-A, CDMA, GSM, and other wireless technologies.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

In an aspect, one or more of the base stations 102 may be an IAB-node. For example, the base station 102/180 may be an IAB-node and may communicate with another base station (e.g., base station 102-a) via a wireless third backhaul link 134. In some implementations, the base station 102/180 may be a CPE. The wireless third backhaul link 134 may be a FWA link. The base station 102-a may also be an IAB-node or may be a central unit (CU) having a first backhaul link 132.

The base station 102-a may include an IAB control component 140 that configures an IAB-node to map non-F1 traffic to uplink RLC channels. For example, the IAB control component 140 may include an indication receiving component 142 configured to receive, from an IAB-node having an F1 connection with the IAB-donor-CU, an indication of a non-F1 type of traffic for backhauling between the IAB-node and the IAB-donor-central unit. The IAB control component 140 may include a configuration transmitting component 144 configured to provide, to the IAB-node, a configuration that maps the non-F1 type of traffic to an uplink transport channel at the IAB-node.

The base station 102/180 may include an IAB signaling component 120 for mapping non-F1 traffic to uplink RLC channels. The IAB signaling component 120 may include an indication transmitting component 122 configured to provide an IAB-donor-CU having an F1 connection with the IAB-node with an indication of a non-F1 type of traffic for backhauling between the IAB-node and the IAB-donor-central unit. The IAB signaling component 120 may include a configuration receiving component 124 configured to receive, from the IAB-donor-CU, a configuration that maps the non-F1 type of traffic to an uplink transport channel at the IAB-node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 130 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 130 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR implementations, the concepts described herein may be applicable to other similar areas, such as LTE, LTE-A, CDMA, GSM, and other wireless technologies as well as subsequent variations and implementations such as, for example, 5G Advanced, 6G, and the like.

Figures 2A, 2B, 2C, 2D:
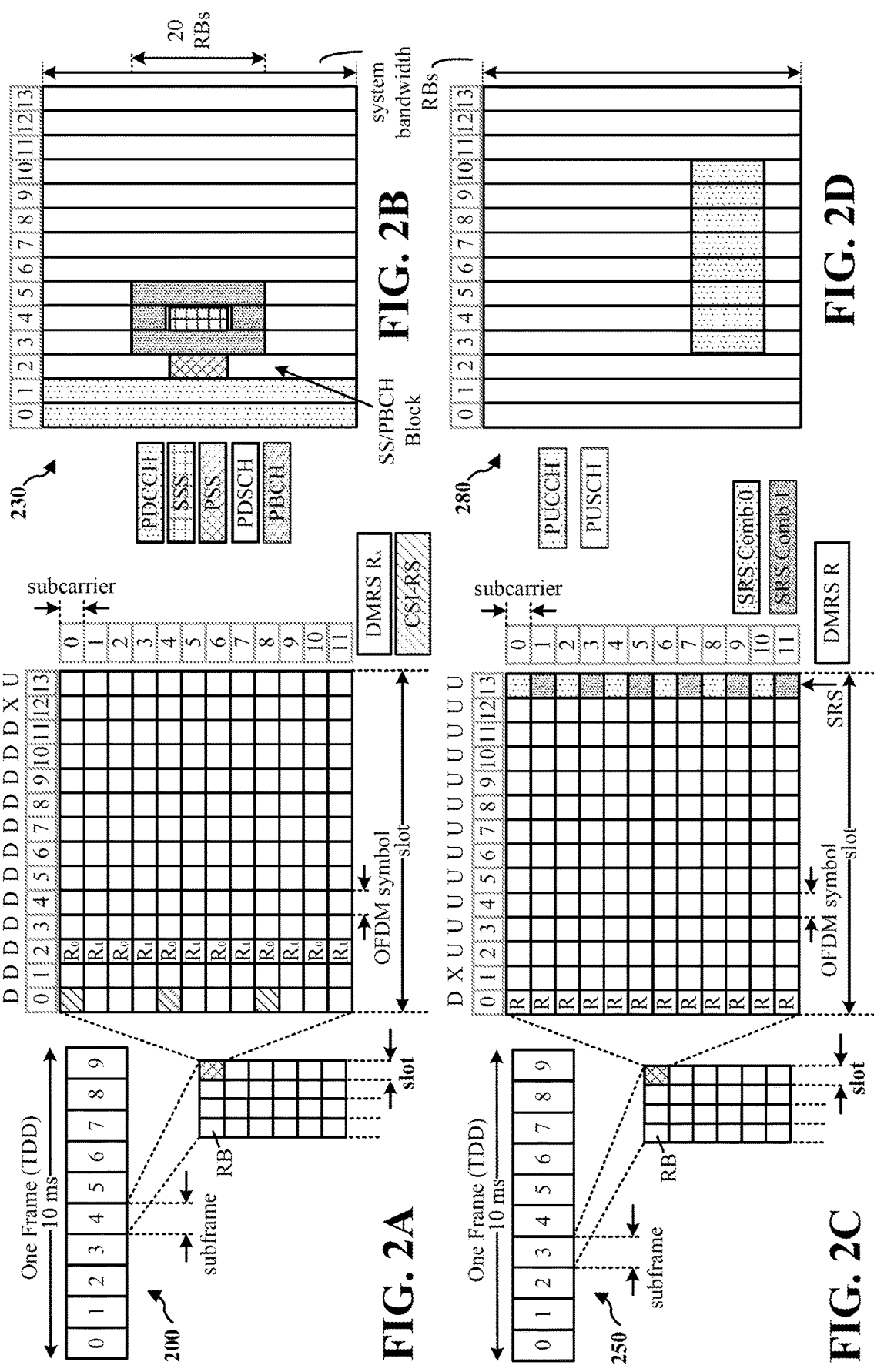
FIG. 2A is a diagram illustrating an example of a first frame.
FIG. 2B is a diagram illustrating an example of DL channels within a subframe.
FIG. 2C is a diagram illustrating an example of a second frame.
FIG. 2D is a diagram illustrating an example of UL channels within a subframe.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be time divisional duplexed (TDD), with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative acknowledgement (NACK) feedback. The PUSCH carries data, and may additionally be used to carry a buffer status report (BSR), a power headroom report (PHR), and/or UCI.

Figure 3:
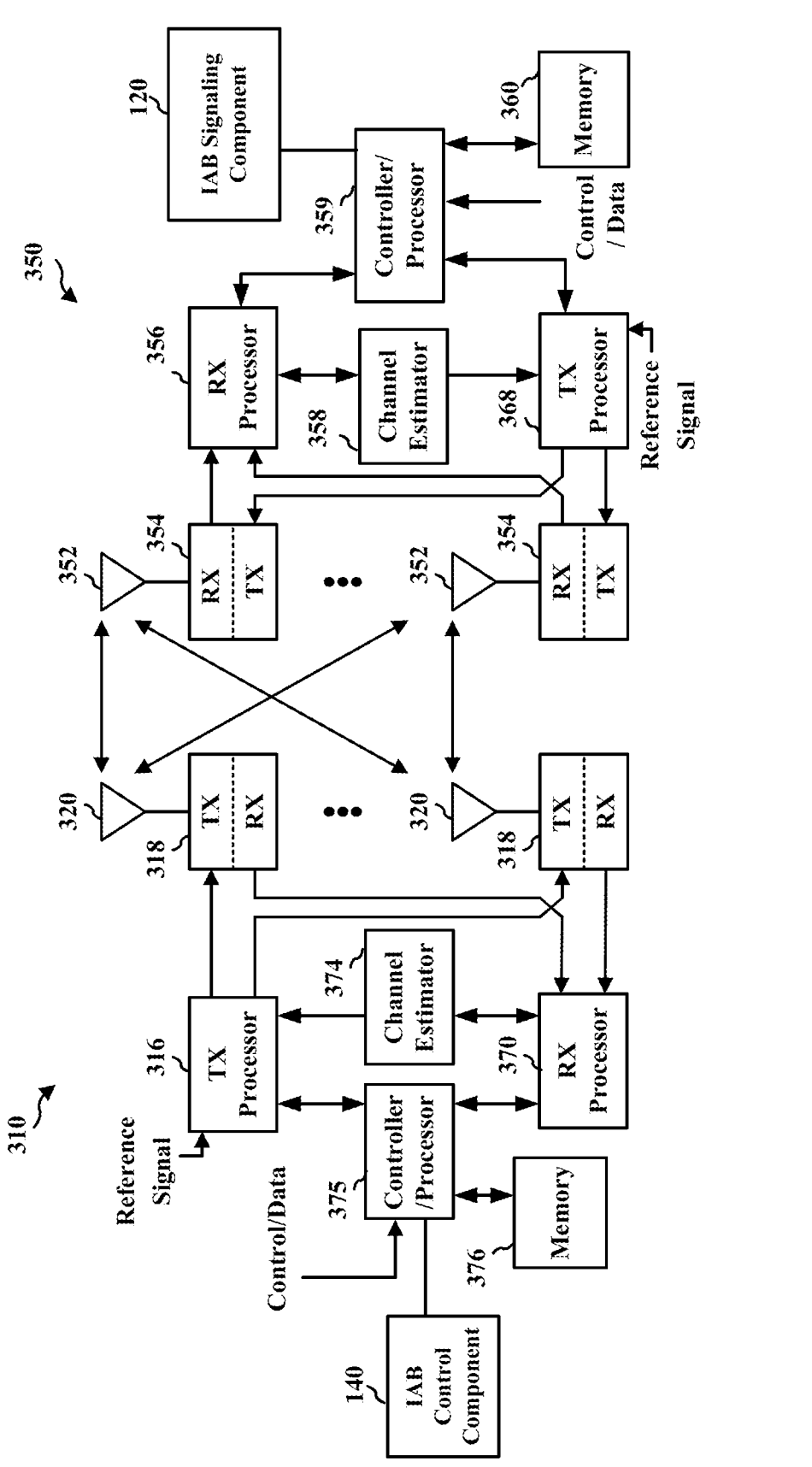
FIG. 3 is a diagram illustrating an example of a base station and user equipment (UE) in an access network.

FIG. 3 is a block diagram of a parent IAB-node 310 in communication with a child IAB-node 350 in an IAB network. In an IAB network, the procedures for communication between a base station and a UE may be reused for a third backhaul links 134 between IAB-nodes. For example, the parent IAB-node 310 may perform the actions of a base station in an access network and a child IAB-node 350 may perform the actions of a UE in an access network to implement a wireless third backhaul link 134.

In the DL, IP packets from the EPC 160 or core network 190 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the child IAB-node 350. Each spatial stream may then be provided to a different antenna 320 via a separate transmitter 318TX. Each transmitter 318TX may modulate an RF carrier with a respective spatial stream for transmission.

At the child IAB-node 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the child IAB-node 350. If multiple spatial streams are destined for the child IAB-node 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the parent IAB-node 310. These soft decisions may be based on channel estimates computed by the channel estimator 358. The soft decisions are then decoded and deinterleaved to recover the data and control signals that were originally transmitted by the parent IAB-node 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the parent IAB-node 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the parent IAB-node 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the parent IAB-node 310 in a manner similar to that described in connection with the receiver function at the child IAB-node 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the child IAB-node 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the IAB control component 140 of FIG. 1. Further, at least one of the TX processor 368, the RX processor 356, and the controller/processor 359 may be configured to perform aspects in connection with the IAB signaling component 120.

At least one of the TX processor 316, the RX processor 370, and the controller/processor 375 may be configured to perform aspects in connection with the IAB signaling component 120 of FIG. 1.

Figure 4:
FIG. 4 is a diagram of an example integrated access and backhaul (IAB) network topology.

Referring to FIG. 4, an example of a network topology 400 for a wireless backhaul network 402 such as an IAB network that includes a donor node 410 and several relay nodes 420 providing access to UEs 104. Wireless backhauls 414 can provide range extension to a wireline backhaul 412 or fronthaul. A wireless backhaul network 402 may support multiple backhaul hops as well as redundant connectivity, e.g. by providing multiple paths between a donor node 410 (e.g., a CU) and a relay node 420 (e.g., one of relay nodes 420-*a*, 420-*b*, 420-*c*, or 420-*d* acting as a parent IAB-node 310 and/or a child IAB-node 350). In this context, the donor node 410 provides the interface between the wireless network and the wireline network (e.g., 5G core network 190 (FIG. 1)).

In an IAB network, the donor node 410 may act as a CU, and each of the relay nodes 420 may act as a distributed unit (DU). Each of the relay nodes 420 may be referred to as an IAB-node. Each IAB-node may include a mobile terminal (MT) portion (IAB-MT) that communicates with a parent node and a distributed unit (DU) portion (IAB-DU) that communicates with a child node. A network topology 400 may include one or more parent nodes and one or more child nodes for each IAB-node that define a location within the network topology 400. For example, a first relay node 420 may be a parent node to second relay node 420 and a child node to a third relay node 420. Child nodes may include UEs 104, which may be connected to a parent IAB-node via an access link 422. For example, the location for the relay node 420-*b* may include the donor node 410 as a parent node, the relay node 420-*c* as a child node, and the UEs 104 as child nodes. As another example, the relay node 420-*c* may have two parent nodes, relay nodes 420-*a* and 420-*b*, and one child node 420-*d*.

Figure 5:
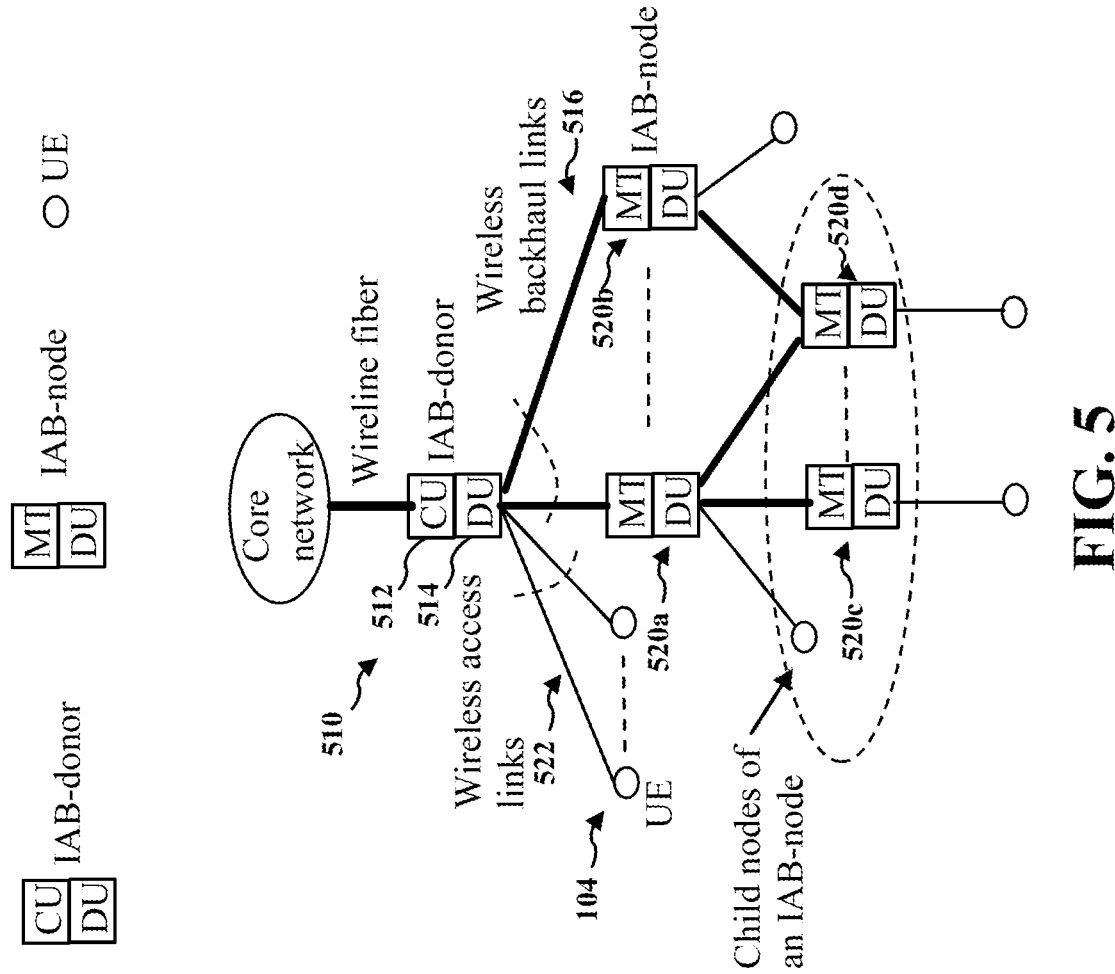
FIG. 5 is a diagram illustrating an example of an IAB network with an IAB-donor and multiple IAB-nodes.
Figure 5:

FIG. 5 is a diagram 500 illustrating an example of an IAB network with an IAB-donor 510 and multiple IAB-nodes 520 (e.g., 520*a*, 520*b*, 520*c*, and 520*d*). The IAB-donor 510 may be an enhanced gNB node with functions to control the IAB network. The IAB-donor 510 may include a central unit (CU) 512 that controls the whole IAB-network through configuration. The IAB-donor 510 may include a distributed unit (DU) 514 as a scheduling node that schedules child nodes (e.g., IAB-nodes 520*a* and 520*b*) of the IAB-donor 510. The IAB-nodes 520 may include a mobile termination (MT) function that performs as a scheduled node similar to a UE scheduled by the IAB-donor 510 or a parent IAB-node. The IAB-nodes 520 may include a DU that schedules child IAB-nodes and UEs. The IAB-nodes 520 may be connected to the IAB-donor 510 via another IAB-node 520. For example, the IAB-node 520*c* may be connected via the IAB-node 520*a*. As another example, the IAB-node 520*d* may be connected to the IAB-donor 510 via multiple IAB-nodes 520*a* and 520*b*. Traffic for multiple UEs 104 or services may be multiplexed over the backhaul connections 516. When an IAB-node 520 has multiple backhaul connections 516, communications may be routed at the BAP layer based on a routing identifier (ID). Each child IAB-node may route traffic toward the IAB-donor 510 based on the routing ID. Further, traffic may be prioritized based on the selected RLC channel. The routing ID and RLC channel may be selected upon entry to the IAB network (e.g., at the serving IAB-node 520 for uplink traffic and the serving IAB-donor DU 514 for downlink traffic). Additionally, multiple UEs 104 may be connected to a respective IAB-node 520 via wireless access links 522. The wireless access links 522 may also one or more multiple RLC channels.

Figure 6:
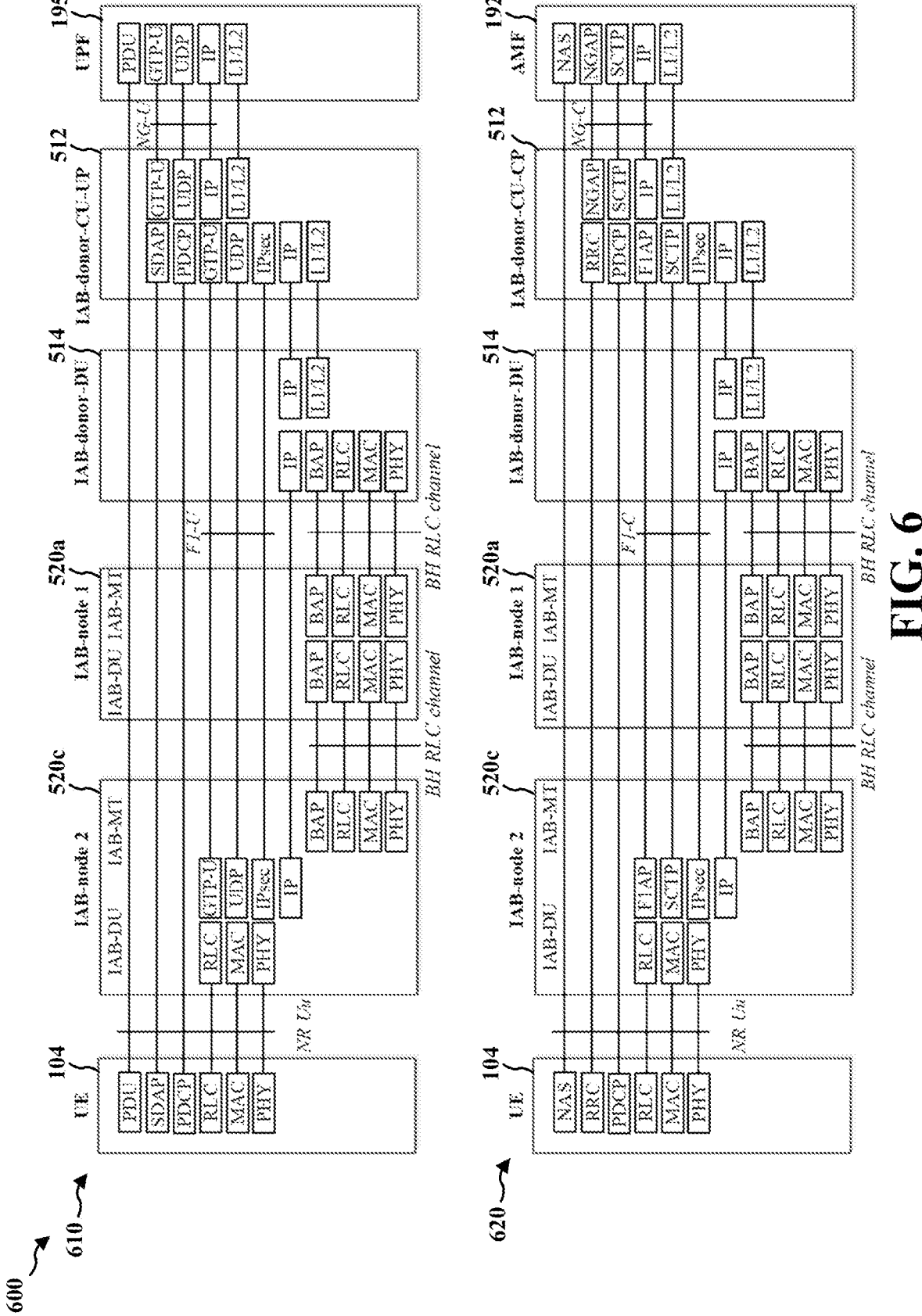
FIG. 6 is a diagram illustrating examples of protocol stacks for an IAB network for the connections between a UE and a core network nodes.

FIG. 6 is a diagram 600 illustrating examples of protocol stacks for an IAB network for the connections between a UE 104 and a UPF 195. The diagram 600 includes a backhaul user-plane (U-plane) protocol stack 610 and a backhaul control-plane (C-plane) protocol stack 620.

For both the backhaul U-plane protocol stack 610 and backhaul C-plane protocol stack 620, the UE 104 may establish a NR Uu connection including the PDU, SDAP, PDCP, RLC, MAC, and PHY layer protocols.

The IAB-nodes may establish an F1 connection from a serving IAB-node 520*c* (e.g., IAB-node 2) to the IAB-donor-CU 512. For the U-plane, the F1-U connection may include general packet radio service (GPRS) tunneling protocol (GTP)-user (GTP-U), user datagram protocol (UDP), IPsec, and IP protocols between the serving IAB-node 520*c* and the IAB-donor-CU 512.

The backhaul links between the IAB-nodes and IAB-donor may be an RLC channel implemented on RLC, MAC, and PHY protocols. The RLC channel may support unacknowledged mode (UM) and acknowledged mode (AM) mode. The BAP layer may be used for routing across the IAB-topology. That is, on the uplink, the BAP layer may select a backhaul RLC channel based on a routing ID and mapping of upper layer traffic to RLC channels. The BAP layer carries the IP layer. The IAB-DU 514 holds the IP address for this IP layer, which is routable from the IP layer on wireless fronthaul. The IAB-donor-DU 514 implements an IP routing function. The IP-address management for this IP layer is performed within the RAN. F1-U uses the same stack as for wireline deployment. F1-U needs to be security-protected via IPsec using 3GPP Network Domain Security framework (SA3).

The backhaul C-plane protocol stack 610 may be similar to the U-plane protocol stack 620 for the NR Uu connection and the backhaul RLC channels. The F1-C connection uses the same stack as for wireline deployment including F1 AP. That is, the F1-C connection includes an F1 Application Protocol (F1 AP) protocol and stream control transmission protocol (SCTP) carried over IP. F1-C needs to be security-protected via IPsec or DTLS using 3GPP Network Domain Security framework (SA3).

Figure 7:
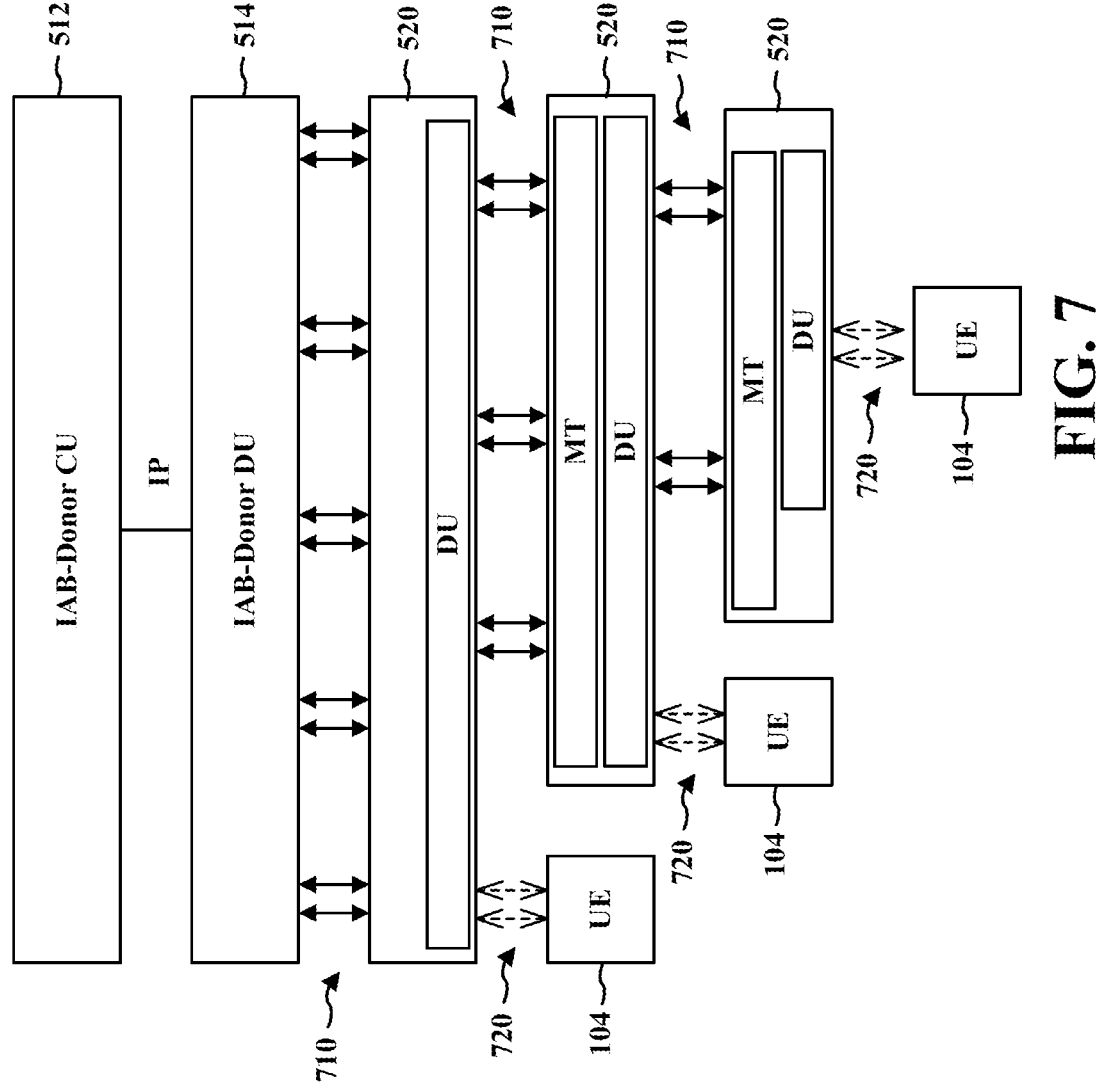
FIG. 7 is a diagram illustrating priority and quality of service (QoS) control in an IAB network using multiple transport channels.

FIG. 7 is a diagram 700 illustrating priority and QoS control in an IAB network. The IAB-donor CU 512 and the IAB-donor DU 514 may be connected via a wireline connection carrying IP. The IAB-Donor DU 514 may be connected to an IAB-node 520 over a plurality of backhaul RLC channels 710. Similarly, a parent IAB-node 520 may be connected to a child IAB-node 520 over a plurality of backhaul RLC channels 710. QoS and traffic prioritization on BH enforced through the selection of backhaul RLC channels 710 per backhaul link. An IAB-node 520 may be connected to a UE 104 via access RLC channels 720.

Conventionally, upper layer traffic is mapped to backhaul RLC channels 710 with three types of traffic: F1-U (or X2-U for LTE) traffic, F1-C traffic, and Non-F1 traffic. For example, F1-U traffic may be identified by a GTP-U tunnel, F1-C traffic may be either non-UE associated traffic or UE-associated F1AP traffic. Non-F1 traffic may include type-1/2/3 (e.g. for different classes of over the air management (OAM) traffic). For example, communication between the UE and a network operator (e.g., related to subscription information) may be non-F1 traffic. There may be multiple F1-U tunnels associated with different QoS, or multiple F1-C/non-F1 instances associated with different priorities. In general F1-C has higher priority compared to any F1-U regardless of QoS. The types of OAM traffic, however, may not contemplate wireless signaling protocols for communications between different nodes. Accordingly, non-F1 traffic including both user plane traffic and control plane traffic may be assigned the same traffic type. The existing traffic classes and priority designations may be inadequate to describe the new use cases for non-F1 traffic for wireless signaling protocols related to CPE. The mapping from upper layer traffic to RLC channel may occur at a traffic entry point to the BAP layer (e.g., access IAB-node and IAB-donor-DU). At intermediate hops, the egress RLC-channels are mapped from ingress RLC-channels. Accordingly, the routing and RLC-channel may not change at intermediate hops.

Figures 8, 9:
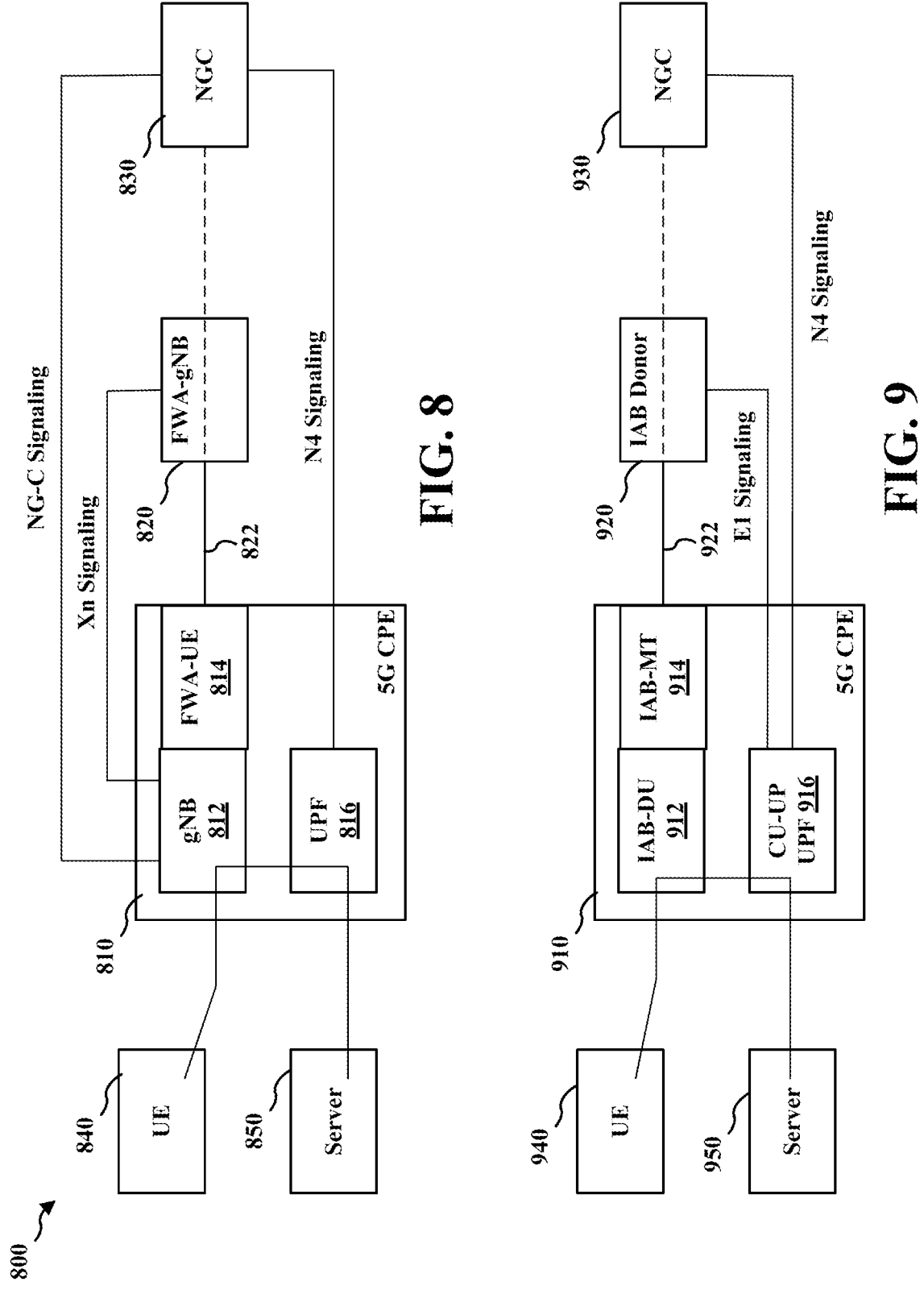
FIG. 8 is a diagram of a first example architecture for a customer premises equipment (CPE) with fixed wireless access (FWA).
FIG. 9 is a diagram of a second example architecture for a CPE with native IAB.

FIG. 8 is a diagram of a first example architecture 800 for CPE with fixed wireless access (FWA). The architecture 800 may be arranged as back to back UEs and gNBs. As illustrated, the CPE 810 may include a serving gNB 812 for local UEs 840 and a FWA UE 814 served by a FWA-gNB 820. The wireless connection 822 between the FWA-UE 814 and the FWA-gNB may utilize IAB IP and BAP transport as described with respect to FIG. 6 for the backhaul. The FWA-gNB 820 may be connected to the NGC 830 via a wired or wireless backhaul.

The CPE 810 may provide connectivity for the UE 840 and other devices such as a server 850 via control plane signaling. For example, the UE 840 may perform NAS signaling with the NGC 830. NAS signaling may utilize a NG-C or NG-AP connection between the serving gNB 812 and the NGC 830. In some implementations utilizing LTE signaling, the NG connection may be an S1 interface. As another example, in a local breakout scenario, the UE 840 may communicate with a server (e.g., a printer) located in the home. Generally, IP packets from the UE 840 would be routed to the NGC 830 and then back to the server 850. Local breakout may allow the CPE 810 to route the traffic from the UE 840 directly to the server 850. In order to implement local breakout, the CPE 810 may include a UPF 816, which may be configured by the NGC 830 via N4 signaling. In some implementations utilizing LTE signaling, the N4 signaling may be an Sx interface. As another example, the gNB 812 and the FWA-gNB 820 may provide the UE 840 with in-band multiplexing of radio resources. That is, the gNB 812 and the FWA-gNB 820 may operate on the same band and coordinate allocation of radio resources. Further, the gNB 812 and the FWA-gNB 820 may support mobility of the UE 840, for example, when the UE moves from indoors to outdoors or vice versa. The gNB 812 and the FWA-gNB may communicate via Xn signaling. In some implementations utilizing LTE signaling, the Xn signaling may be an X2 interface. The NG-C/S1 signaling, N4/Sx signaling, and Xn/X2 signaling may all be considered non-F1 traffic for the wireless connection 822. These new types of non-F1 traffic may not be adequately classified in the existing non-F1 traffic types and QoS or priority differentiation may not be sufficient when this traffic is transported using an IAB backhaul including the wireless connection 822.

FIG. 9 is a diagram of a second example architecture 900 for CPE with native IAB. The architecture 900 may be arranged with the CPE 910 including an IAB-node having an IAB-DU 912 and an IAB-MT 914. The CPE 910 may be a child IAB-node of an IAB-donor 920. As discussed above with respect to FIGS. 5 and 6, the wireless connection 922 may include zero or more intermediate IAB-nodes. The wireless connection 922 between the IAB-MT 914 and the IAB-donor 920 may utilize IAB IP and BAP transport as described with respect to FIG. 6 for the backhaul. The IAB-Donor 920 may be connected to the NGC 930 via a wired backhaul.

Similar to the first example architecture 800, the second example architecture 900 may support NAS signaling, mobility, and local breakout for the UEs 940 and server 950. NAS signaling may be between the UE 940 and a designated AMF in the NGC 930. The NAS signaling may be exchanged as containers in RRC signaling between the UE 940 and the IAB-donor 920, which uses F1 signaling between the DU 912 and IAB-donor 920. Similarly, mobility between the CPE 910 and other IAB-nodes may be handled by the IAB-donor 920 via F1 signaling. For local breakout, the CPE 910 may include a local CU-UP UPF to terminate local traffic. The CU-CP may be located at the IAB-donor 920 and communicate with the local CU-UP UPF 916 via E1 signaling. In some implementations utilizing LTE signaling, the E1 signaling may be a W1 interface. Additionally, the UPF function of the local CU-UP UPF 916 may be configured by the NGC 930 via N4 signaling. The E1/W1 signaling and N4/Sx signaling may be considered non-F1 traffic for backhaul over the wireless connection 922. These new types of non-F1 traffic may not be adequately classified in the existing non-F1 traffic types and QoS or priority differentiation may not be sufficient when this traffic is transported using an IAB backhaul including the wireless connection 922.

Figure 10:
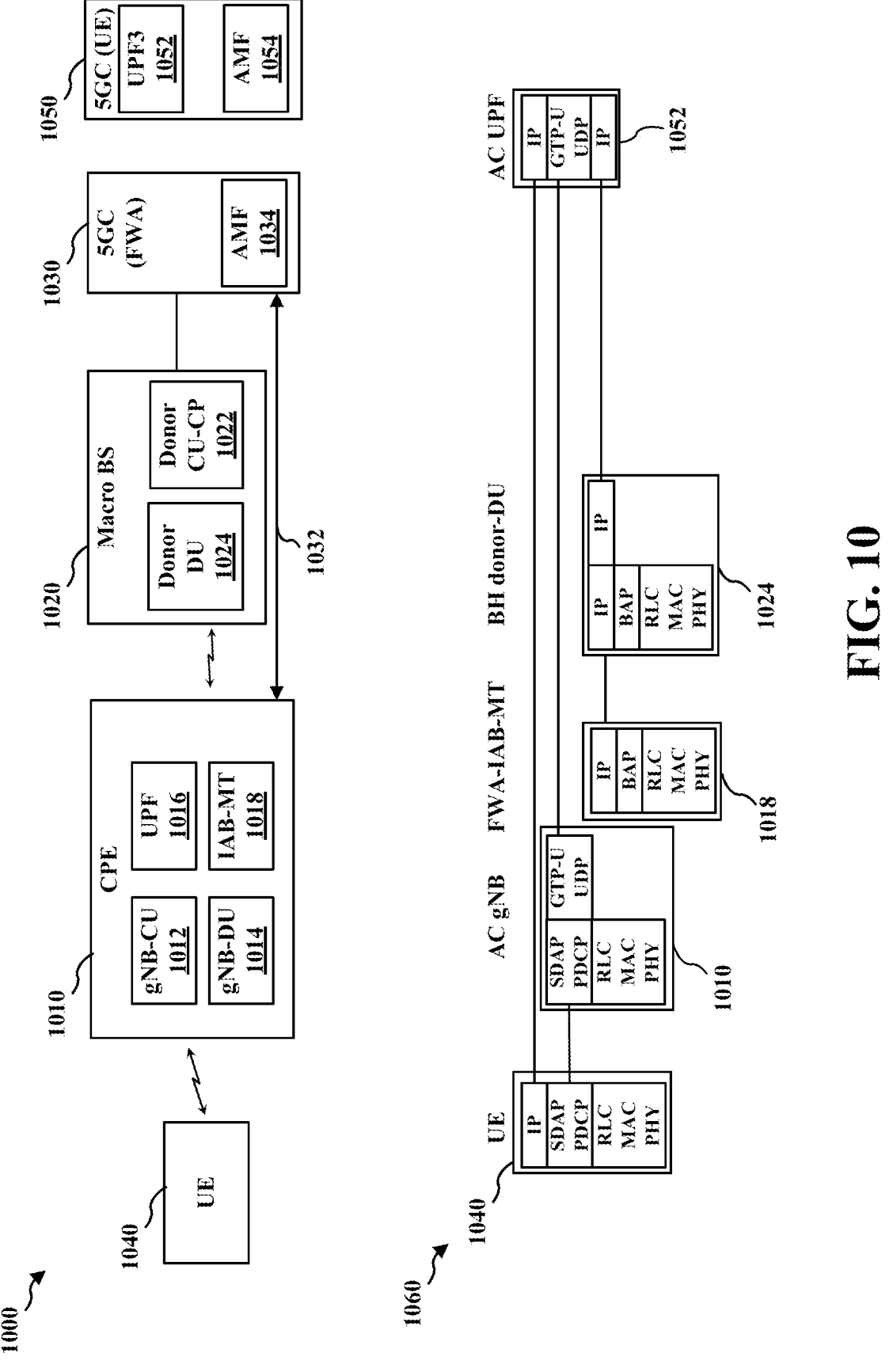
FIG. 10 is a diagram of a first example architecture and a protocol stack for a CPE with FWA and different RANs.

FIG. 10 is a diagram of a first example architecture 1000 and a protocol stack 1060 for a CPE 1010 with FWA and different RANs. For example, as illustrated, the CPE 1010 may be connected with a core network 1030 for the CPE 1010 via a FWA connection 1032. The CPE 1010 may alternatively be referred to as an enhanced residential gateway (eRG) or a Premises Radio Access Station (PRAS). The CPE 1010 may include a base station that serves one or more UEs 1040 including a gNB-CU 1012 and gNB-DU 1014. The CPE 1010 may include a user plane function 1016. The FWA connection 1032 may be implemented via a macro base station 1020. The macro base station 1020 may be an IAB-donor node including an IAB-donor CU-CP 1022 and an IAB-donor DU 1024. The IAB-donor DU 1024 may serve an IAB-MT 1018 at the CPE 1010. The UE 1040 may be connected to a core network 1050 for the UE 1040 via the CPE 1010. The core network 1050 may be different than the core network 1030 (e.g., an access PLMN and a backhaul PLMN). For example, the core network 1030 may include an AMF 1034 for the IAB0MT 1018, and the core network 1050 may include an AMF 1054 for the UE 1040 and an UPF 1052 for the UE 1040. The protocol stack 1060 shows that the gNB of the CPE 1010 may establish an Ng-U tunnel with the UPF 1052 as GTP-U UDP packets carried as IP packets over the IAB-backhaul. Accordingly, Ng-U traffic for the access PLMN may be transported over the backhaul PLMN via IP and BAP. This Ng-U traffic may be a new type of non-F1 traffic that may not be adequately classified in the existing non-F1 traffic types and QoS or priority differentiation may not be sufficient when this traffic is transported using an IAB backhaul including the wireless connection between IAB-MT 1018 and the IAB-donor DU 1024.

Figure 11:
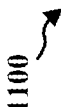
FIG. 11 is a message diagram illustrating example communications between an IAB-node and an IAB-donor.

FIG. 11 is a message diagram 1100 illustrating example communications between an IAB-node 520 and an IAB-donor 510. The IAB-node 520 may be a CPE such as CPE 810, 910, or 1010. The IAB-donor 510 may be an FWA-gNB 820, IAB-donor 920, or macro base station 1020 depending on the architecture. The IAB-node 520 and the IAB-donor 510 may have an established F1 connection that is to be used for backhaul. For example, the F1-connection may be supported on a protocol stack including IP, BAP, RLC, MAC, and PHY layers as illustrated in FIG. 6.

The IAB-node 520 may provide an indication 1110 to the IAB-donor 510. The indication 1110 may indicate an UL traffic type 1112. For example, the UL traffic type 1112 may be a field that indicates a control plane or user plane interface. For example, the UL traffic type 1112 may identify the non-F1 type of traffic as one of: NG, S1, Xn, X2, E1, W1, N4, or Sx traffic. In some implementations, the indication 1110 may include QoS characteristics 1114 or a priority class 1116 of the non-F1 type of traffic. In some implementations, the indication 1110 includes one or more IP header fields 1118 for protocol data units of the non-F1 type of traffic. For example, the IP header fields 1118 may include an IP 5-tuple of source address, source port, destination address, destination port, and protocol. In some implementations, the indication 1110 may specify a plane 1120 of the traffic (e.g., whether the non-F1 type of traffic is control plane signaling or user plane data). In some implementations, the indication 1110 may specify a direction 1122 of the non-F1 type of traffic. In some implementations, the indication 1110 may specify whether the non-F1 type of traffic is associated with a UE or not associated with a UE (e.g., UE associated 1124).

The IAB-donor 510 may transmit a configuration 1130 that maps the non-F1 type of traffic to an uplink transport channel (e.g., an RLC channel 710) at the IAB-node. For example, the configuration 1130 may include an UL traffic mapping 1132, which may be a BAP configuration. The UL traffic mapping 1132 may map the UL traffic type 1112 to a routing ID 1134 and/or a RLC channel 1136. The routing ID 1134 may be a BAP routing ID. In some implementations, the configuration 1130 may include a transport channel configuration 1138. For example, the RLC channel 1136 may be a new RLC channel defined by the transport channel configuration 1138.

In some implementations, the IAB-node 520 may provide a modification or release 1150. The modification or release 1150 may include similar content to the indication 1110. The IAB-donor 510 may update the configuration 1130 and send an updated configuration 1160 in response to the modification or release 1150.

Figure 12:
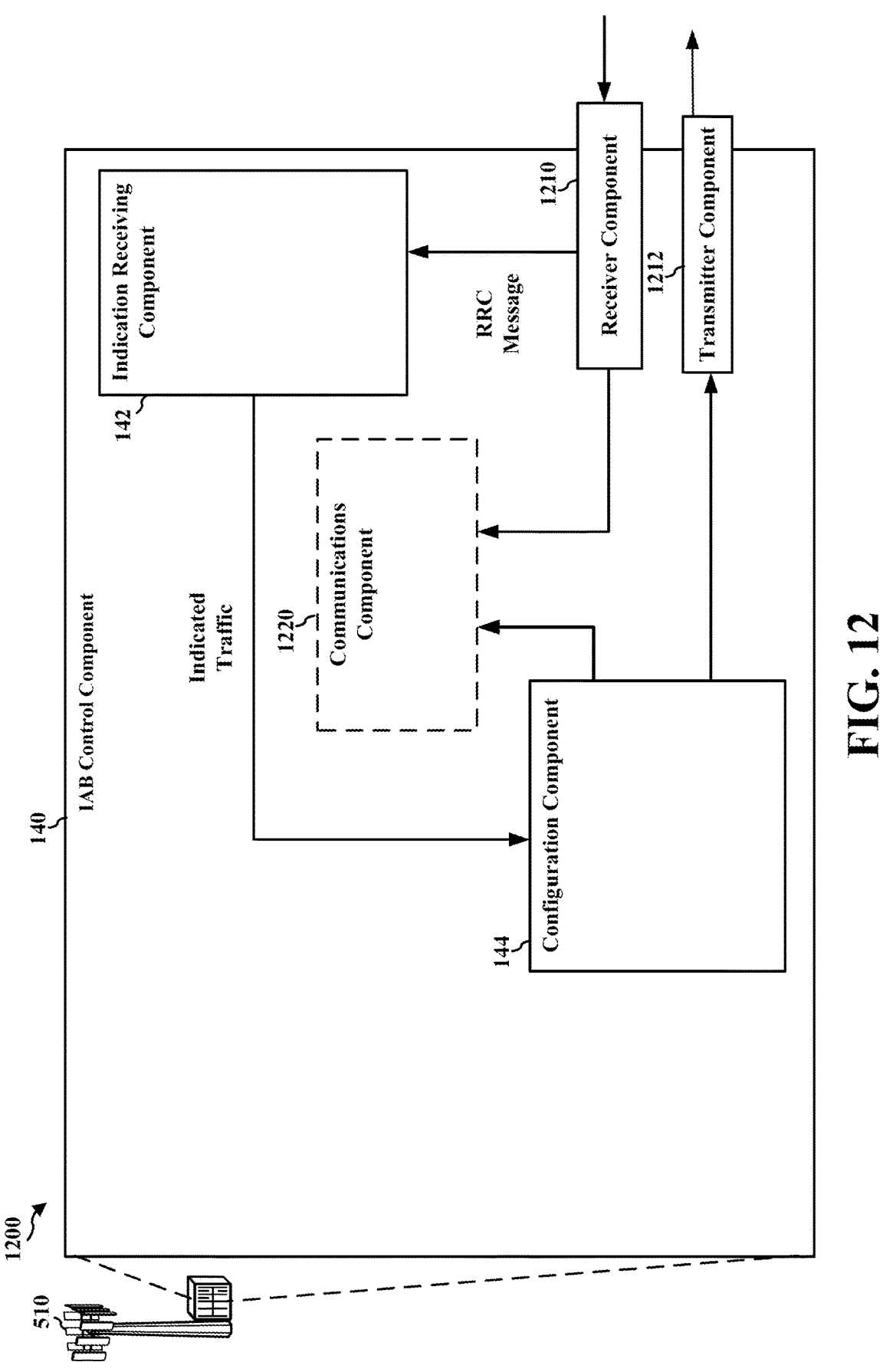
FIG. 12 is a conceptual data flow diagram illustrating the data flow between different means/components in an example IAB-donor.

FIG. 12 is a conceptual data flow diagram 1200 illustrating the data flow between different means/components in an example IAB-donor 510, which may be an example of the base station 102-*a* including the IAB control component 140.

The IAB-donor 510 may include a receiver component 1210, which may include, for example, a radio frequency (RF) receiver for receiving the signals described herein. The IAB-donor 510 may include a transmitter component 1212, which may include, for example, an RF transmitter for transmitting the signals described herein. In an aspect, the receiver component 1210 and the transmitter component 1212 may be co-located in a transceiver such as illustrated by the TX/RX 318 in FIG. 3.

As discussed above regarding FIG. 1, the IAB control component 140 may include an indication receiving component 142 and a configuration transmitting component 144. In some implementations, the IAB control component 140 may include a communications component 1220 that is configured to communicate non-F1 traffic according to a configured uplink transport channel.

The receiver component 1210 may receive uplink signals such as the indication 1110, the non-F1 traffic 1140, and the modification or release 1150. The receiver component 1210 may pass the indication 1110 and/or the modification or release 1150 to the configuration transmitting component 144. The receiver component 1210 may pass the non-F1 traffic to the communications component 1220.

The indication receiving component 142 may receive the indication 1110 from the receiver component 1210. The indication receiving component 142 may identify contents of the indication 1110. For example, in some implementations, the indication 1110 is an RRC message or an F1 connection message. The indication receiving component 142 may identify information elements included in the indication 1110. For example, the indication receiving component 142 may identify one or more of the UL traffic type 1112, the QoS characteristics 1114, the priority class 1116, the IP header fields 1118, the plane 1120, the direction 1122, or whether the traffic is UE associated 1124. The indication receiving component 142 may provide the indication information to the configuration transmitting component 144.

The configuration transmitting component 144 may receive the indication information from the indication receiving component 142. The configuration transmitting component 144 may determine the UL traffic mapping 1132 based on the indication information. For example, where the indication information includes an explicit indication of the UL traffic type 1112, the configuration transmitting component 144 may be configured to select a routing ID 1134 and/or RLC channel 1136 appropriate for the UL traffic type 1112. For instance, the configuration transmitting component 144 may look up requirements for the UL traffic type 1112 and select a mapping that satisfies the requirements. As another example, where the indication information includes QoS characteristics 1114 or the priority class 1116, the configuration transmitting component 144 may determine a routing ID 1134 or RLC channel 1136 that can satisfy the requested QoS characteristics 1114 or priority class 1116. When an RLC channel 1136 is not available for a UL traffic type 1112, QoS characteristics 1114, or priority class 1116, the configuration transmitting component 144 may configure a new RLC channel and generate a transport channel configuration 1138 indicating a new routing ID 1134 and/or RLC channel 1136. The configuration transmitting component 144 may generate the configuration 1130. The configuration 1130 may include at least the UL traffic mapping 1132. The configuration transmitting component 144 may transmit the configuration 1130 to the IAB-node 520 via the transmitter component 1212. For example, the configuration 1130 may be an RRC message or an F1 connection message. In some implementations, the configuration transmitting component 144 may provide the configuration 1130 to a communications component 1220.

The communications component 1220 may receive the configuration 1130 from the configuration transmitting component 144. The communications component 1220 may communicate non-F1 traffic 1140 based on the configuration 1130. For example, the communications component 1220 may receive non-F1 traffic 1140 from the receiver component 1210. The communications component 1220 may determine the traffic type based on the UL traffic mapping 1132 and/or content of the non-F1 traffic 1140. The communications component 1220 may provide the non-F1 traffic to the correct upper layer application. In some implementations, the communications component 1220 may forward the non-F1 traffic 1140 to another node (e.g., UPF 195 or AMF 192) based on the traffic type and or IP destination.

Figure 13:
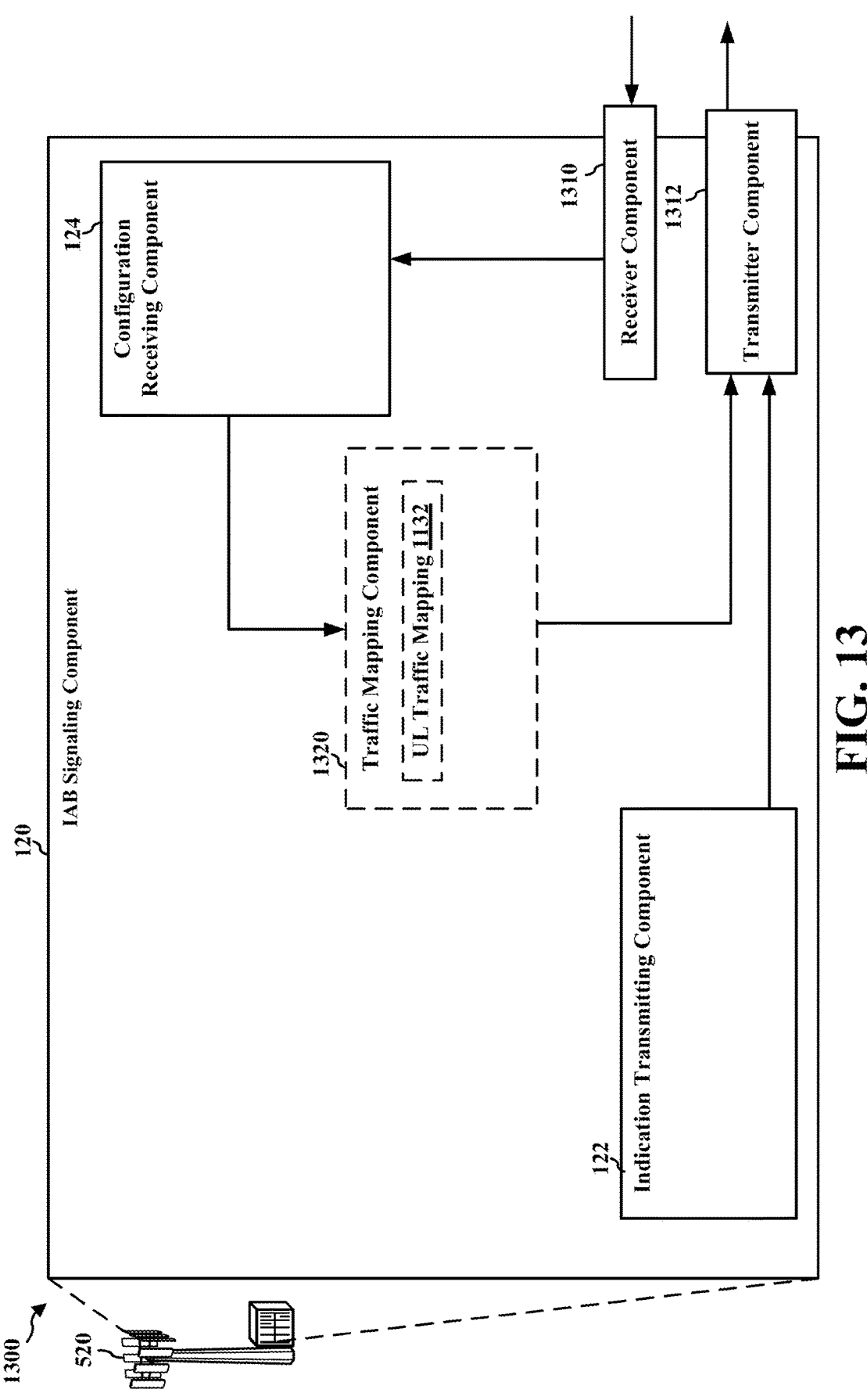
FIG. 13 is a conceptual data flow diagram illustrating the data flow between different means/components in an example IAB-node.

FIG. 13 is a conceptual data flow diagram 1300 illustrating the data flow between different means/components in an example IAB-node 520, which may be an example of the base station 102/180 including the IAB signaling component 120. As discussed above with respect to FIG. 1, the IAB signaling component 120 may include an indication transmitting component 122 and a configuration receiving component 124. The IAB signaling component 120 may optionally include a traffic mapping component 1320.

The IAB-node 520 may include a receiver component 1310, which may include, for example, a RF receiver for receiving the signals described herein. The IAB-node 520 may include a transmitter component 1312, which may include, for example, an RF transmitter for transmitting the signals described herein. In an aspect, the receiver component 1310 and the transmitter component 1312 may be co-located in a transceiver such as illustrated by the TX/RX 354 in FIG. 3.

The receiver component 1310 may receive downlink signals such as the configuration 1130, non-F1 traffic 1140, and updated configuration 1160. The receiver component 1310 may pass the configuration 1130 and updated configuration 1160 to the configuration receiving component 122. The receiver component 1210 may pass the non-F1 traffic 1140 to the communications component 1220.

The indication transmitting component 122 may receive a request for non-F1 traffic from a higher layer application such as the UPF 816 or CU-UP UPF 916. For example, the higher layer application may be attempting to establish a connection for NG, S1, Xn, X2, E1, W1, N4, or Sx traffic. The indication transmitting component 122 may generate the indication 1110. In some implementations, the indication transmitting component 122 may explicitly identify the UL traffic type 1112. In some implementations, the indication transmitting component 122 may determine QoS characteristics 1114 and/or a priority class for the non-F1 traffic, for example, based on the UL traffic type 1112 or a request from the higher layer application. The indication transmitting component 122 may include one or more of IP header fields 1118, plane 1120, direction 1122, whether the non-F1 traffic is UE associated 1124 in the indication 1110. The indication transmitting component 122 may transmit the indication 1110 to the IAB-donor 510 via the transmitter component 1312. For example, the indication transmitting component 122 may transmit the indication 1110 as an RRC message or an F1 connection message.

The configuration receiving component 124 may receive the configuration 1130 from the receiver component 1310. The configuration receiving component 124 may determine the UL traffic mapping 1132 based on the configuration 1130. The configuration receiving component 124 may configure the traffic mapping component 1320 with the UL traffic mapping 1132. When the configuration 1130 includes a transport channel configuration 1138, the configuration receiving component 124 may configure a new backhaul RLC channel.

The traffic mapping component 1320 may receive UL non-F1 traffic from higher layer applications. The traffic mapping component 1320 may map the UL non-F1 traffic to RLC channels 710 based on the UL traffic mapping 1132. For example, the traffic mapping component 1320 may place an IP packet for the UL non-F1 traffic into an RLC logical channel queue selected based on the UL traffic mapping 1132. The traffic mapping component 1320 may process the RLC logical channel queues according to the RLC layer and MAC layer to generate transport blocks for transmission via the transmitter component 1312.

FIG. 14 is a flowchart of an example method 1400 for backhaul transport of non-F1 traffic. The method 1400 may be performed by an IAB-node 520, which may be an example of the base station 102/180, the CPE 810, the CPE 910, or the CPE 1010. The IAB-node 520 may include a FWA-UE 814 or IAB-MT 814, which may include memory 360 and which may be the entire IAB-node 520 or a component of the IAB-node 520 such as the IAB signaling component 120, TX processor 368, the RX processor 356, or the controller/processor 359. The method 1400 may be performed by the IAB signaling component 120 in communication with the IAB control component 140 of the IAB-donor 510.

At block 1410, the method 1400 may include providing an IAB-donor-CU having an F1 connection with the IAB-node with an indication of a non-F1 type of traffic for backhauling between the IAB-node and the IAB-donor-central unit. In an aspect, for example, the IAB-node 520, the TX processor 368, the RX processor 356, or the controller/processor 359 may execute the IAB signaling component 120 and/or the indication transmitting component 122 to provide an IAB-donor-CU having an F1 connection with the IAB-node 520 with an indication 1110 of a non-F1 type of traffic (e.g., UL traffic type 1112) for backhauling between the IAB-node 520 and the IAB-donor-CU 512. For example, at sub-block 1412, the block 1410 may include transmitting a message via a RRC protocol or the F1 connection. In some implementations, the indication 1110 identifies the non-F1 type of traffic as one of: NG, S1, Xn, X2, E1, W1, N4, or Sx traffic. In some implementations, the indication 1110 includes QoS characteristics 1114 or a priority class 1116 of the non-F1 type of traffic. In some implementations, the indication 1110 includes one or more IP header fields 1118 for protocol data units of the non-F1 type of traffic. In some implementations, the indication 1110 specifies whether the non-F1 type of traffic is control plane signaling or user plane data. In some implementations, the indication 1110 specifies a direction 1122 of the non-F1 type of traffic. In some implementations, the indication 1110 specifies whether the non-F1 type of traffic is associated with a UE or not associated with a UE. In some implementations, the indication 1110 requests a transport channel with QoS characteristics or a priority class. Accordingly, the IAB-node 520, the TX processor 368, the RX processor 356, or the controller/processor 359 executing the IAB signaling component 120 and/or the indication transmitting component 122 may provide means for providing an IAB-donor-CU having an F1 connection with the IAB-node with an indication of a non-F1 type of traffic for backhauling between the IAB-node and the IAB-donor-CU.

At block 1420, the method 1400 may include receiving, from the IAB-donor-CU, a configuration that maps the non-F1 type of traffic to an uplink transport channel at the IAB-node. In an aspect, for example, the IAB-node 520, the TX processor 368, the RX processor 356, or the controller/processor 359 may execute the IAB signaling component 120 and/or the configuration receiving component 124 to receive, from the IAB-donor-CU 512, a configuration 1130 that maps the non-F1 type of traffic to an uplink transport channel (e.g., RLC channel 710) at the IAB-node 520. For example, at sub-block 1422, the block 1420 may include receiving a message via a RRC protocol or the F1 connection. In some implementations, the transport channel is a backhaul RLC channel 710. In some implementations, the configuration is a BAP configuration. For example, wherein the configuration may be a BAP uplink mapping configuration. In some implementations, the configuration 1130 maps the non-F1 type of traffic to a routing identifier. In some implementations, the configuration 1130 includes a configuration 1138 of the transport channel from the IAB-node 520 to the IAB-donor-CU 510. Accordingly, the IAB-node 520, the TX processor 368, the RX processor 356, or the controller/processor 359 executing the IAB signaling component 120 and/or the indication receiving component 142 may provide means for receiving, from the IAB-donor-CU, a configuration that maps the non-F1 type of traffic to an uplink transport channel at the IAB-node.

At block 1430, the method 1400 may optionally include transmitting uplink non-F1 traffic to the IAB-donor-CU over the uplink transport channel based on the configuration. In an aspect, for example, the IAB-node 520, the TX processor 368, the RX processor 356, or the controller/processor 359 may execute the IAB signaling component 120 and/or the traffic mapping component 1320 to transmit uplink non-F1 traffic 1140 to the IAB-donor-CU 512 over the uplink transport channel (e.g., backhaul RLC channel 710) based on the configuration 1130. Accordingly, the IAB-node 520, the TX processor 368, the RX processor 356, or the controller/processor 359 executing the IAB signaling component 120 and/or the traffic mapping component 1320 may provide means for transmitting uplink non-F1 traffic to the IAB-donor-CU over the uplink transport channel based on the configuration.

At block 1440, the method 1400 may optionally include indicating a modification or release of the non-F1 type of traffic to the IAB-donor-CU. In an aspect, for example, the IAB-node 520, the TX processor 368, the RX processor 356, or the controller/processor 359 may execute the IAB signaling component 120 and/or the indication transmitting component 122 to indicate a modification or release 1150 of the non-F1 type of traffic to the IAB-donor-CU 512. Accordingly, the IAB-node 520, the TX processor 368, the RX processor 356, or the controller/processor 359 executing the IAB signaling component 120 and/or the indication transmitting component 122 may provide means for indicating a modification or release of the non-F1 type of traffic to the IAB-donor-CU.

At block 1450, the method 1400 may include receiving, from the IAB-donor-CU, an updated configuration. In an aspect, for example, the IAB-node 520, the TX processor 368, the RX processor 356, or the controller/processor 359 may execute the IAB signaling component 120 and/or the configuration receiving component 124 to receive, from the IAB-donor-CU 512, an updated configuration 1160. Accordingly, the IAB-node 520, the TX processor 368, the RX processor 356, or the controller/processor 359 executing the IAB signaling component 120 and/or the configuration receiving component 124 may provide means for receiving, from the IAB-donor-CU, an updated configuration.

FIG. 15 is a flowchart of an example method 1500 for controlling uplink transmission of non-F1 traffic. The method 1500 may be performed by an IAB-donor 510 such as the base station 102-a that includes IAB-donor-CU 512, or an FWA-gNB 820. The IAB-donor 510 may include the memory 376 and may be the entire IAB-donor 510 or a component of the IAB-donor 510 such as the IAB control component 140, TX processor 316, the RX processor 370, or the controller/processor 375. The method 1500 may be performed by the IAB control component 140 in communication with the IAB signaling component 120 of the IAB-node 520.

At block 1510, the method 1500 may include receiving, from an IAB-node having an F1 connection with the IAB-donor-CU, an indication of a non-F1 type of traffic for backhauling between the IAB-node and the IAB-donor-central unit. In an aspect, for example, the IAB-donor 510, the TX processor 316, the RX processor 370, or the controller/processor 375 may execute the IAB control component 140 and/or the indication receiving component 142 to receive, from an IAB-node 520 having an F1 connection with the IAB-donor-CU 512, an indication 1110 of a non-F1 type of traffic for backhauling between the IAB-node and the IAB-donor-central unit. For example, at sub-block 1512, the block 1510 may include receiving a message via a RRC protocol or the F1 connection. In some implementations, the indication 1110 identifies the non-F1 type of traffic as one of: NG, S 1, Xn, X2, E1, W1, N4, or Sx traffic. In some implementations, the indication 1110 includes QoS characteristics 1114 or a priority class 1116 of the non-F1 type of traffic. In some implementations, the indication 1110 includes one or more IP header fields 1118 for protocol data units of the non-F1 type of traffic. In some implementations, the indication 1110 specifies whether the non-F1 type of traffic is control plane signaling or user plane data. In some implementations, the indication 1110 specifies a direction 1122 of the non-F1 type of traffic. In some implementations, the indication 1110 specifies whether the non-F1 type of traffic is associated with a UE or not associated with a UE. In some implementations, the indication 1110 requests a transport channel with QoS characteristics or a priority class. Accordingly, the IAB-donor 510, the TX processor 316, the RX processor 370, or the controller/processor 375 executing the IAB signaling component 120 and/or the indication transmitting component 122 may provide means for providing an IAB-donor-CU having an F1 connection with the IAB-node with an indication of a non-F1 type of traffic for backhauling between the IAB-node and the IAB-donor-central unit.

At block 1520, the method 1500 may include providing, to the IAB-node, a configuration that maps the non-F1 type of traffic to an uplink transport channel at the IAB-node. In an aspect, for example, the IAB-donor 510, the TX processor 316, the RX processor 370, or the controller/processor 375 may execute the IAB control component 140 and/or the configuration transmitting component 144 to provide, to the IAB-node 510, a configuration 1130 that maps the non-F1 type of traffic to an uplink transport channel (e.g., backhaul RLC channel 710) at the IAB-node. For example, at sub-block 1522, the block 1520 may include receiving a message via a RRC protocol or the F1 connection. In some implementations, the transport channel is a backhaul RLC channel 710. In some implementations, the configuration 1130 is a BAP configuration. For example, the configuration 1130 may be a BAP uplink mapping configuration. In some implementations, the configuration 1130 maps the non-F1 type of traffic to a routing identifier 1134. In some implementations, the configuration 1130 includes a configuration 1138 of the transport channel from the IAB-node 520 to the IAB-donor-CU 510. Accordingly, the IAB-donor 510, the TX processor 316, the RX processor 370, or the controller/ processor 375 executing the IAB signaling component 120 and/or the configuration transmitting component 144 may provide means for providing, to the IAB-node, a configuration that maps the non-F1 type of traffic to an uplink transport channel at the IAB-node.

At block 1530, the method 1500 may optionally include receiving uplink non-F1 traffic from the IAB-node over the uplink transport channel based on the configuration. In an aspect, for example, the IAB-donor 510, the TX processor 316, the RX processor 370, or the controller/processor 375 may execute the IAB control component 140 and/or the communications component 1220 to receive uplink non-F1 traffic 1140 from the IAB-node 520 over the uplink transport channel based on the configuration. Accordingly, the IAB-donor 510, the TX processor 316, the RX processor 370, or the controller/processor 375 executing the IAB signaling component 120 and/or the communications component 1220 may provide means for receiving uplink non-F1 traffic from the IAB-node over the uplink transport channel based on the configuration.

At block 1540, the method 1500 may optionally include receiving an indication of a modification or release of the non-F1 type of traffic to the IAB-donor-CU. In an aspect, for example, the IAB-donor 510, the TX processor 316, the RX processor 370, or the controller/processor 375 may execute the IAB control component 140 and/or the indication receiving component 142 to receive an indication of a modification or release of the non-F1 type of traffic to the IAB-donor-CU. Accordingly, the IAB-donor 510, the TX processor 316, the RX processor 370, or the controller/processor 375 executing the IAB signaling component 120 and/or the indication receiving component 142 may provide means for receiving an indication of a modification or release of the non-F1 type of traffic to the IAB-donor-CU.

At block 1550, the method 1500 may include transmitting an updated configuration from the IAB-donor-CU. In an aspect, for example, the IAB-donor 510, the TX processor 316, the RX processor 370, or the controller/processor 375 may execute the IAB signaling component 120 and/or the configuration transmitting component 144 to transmit an updated configuration 1160 from the IAB-donor-CU. Accordingly, the IAB-donor 510, the TX processor 316, the RX processor 370, or the controller/processor 375 executing the IAB control component 140 and/or the configuration transmitting component 144 may provide means for transmitting an updated configuration from the IAB-donor-CU.

Some Further Example Clauses

Implementation examples are described in the following numbered clauses:

1. A method of wireless communication, comprising, at an integrated access and backhaul (IAB) node:
    providing an IAB-donor-central unit (CU) having a connection with the IAB-node with an indication of a non-F1 type of traffic for backhauling between the IAB-node and the IAB-donor-CU; and receiving, from the IAB-donor-CU, a configuration that maps the non-F1 type of traffic to an uplink transport channel at the IAB-node.
2. The method of clause 1, wherein the indication identifies the non-F1 type of traffic as one of: NG, S1, Xn, X2, E1, W1, N4, or Sx traffic.
3. The method of clause 1 or 2, wherein the indication includes quality of service (QoS) characteristics or a priority class of the non-F1 type of traffic.
4. The method of any of clauses 1-3, wherein the indication includes one or more internet protocol (IP) header fields for protocol data units of the non-F1 type of traffic.
5. The method of any of clauses 1-4, wherein the indication specifies whether the non-F1 type of traffic is control plane signaling or user plane data.
6. The method of any of clauses 1-5, wherein the indication specifies a direction of the non-F1 type of traffic.
7. The method of any of clauses 1-6, wherein the indication specifies whether the non-F1 type of traffic is associated with a user equipment (UE) or not associated with a UE.
8. The method of any of clauses 1-7, wherein the transport channel is a backhaul radio link control (RLC) channel.
9. The method of any of clauses 1-8, wherein the indication requests a transport channel with quality of service (QoS) characteristics or a priority class.
10. The method of any of clauses 1-9, wherein the configuration is a backhaul adaptation protocol (BAP) configuration.
11. The method of clause 10, wherein the configuration is a BAP uplink mapping configuration.
12. The method of any of clauses 1-11, wherein the configuration maps the non-F1 type of traffic to a routing identifier.
13. The method of any of clauses 1-12, wherein the configuration includes a configuration of the transport channel from the IAB-node to the IAB-donor-CU.
14. The method of any of clauses 1-13, wherein providing the indication comprises transmitting a message via a radio resource control (RRC) protocol or the F1 connection.
15. The method of any of clauses 1-14, wherein receiving the configuration comprises receiving a message via a RRC protocol or the F1 connection.
16. The method of any of clauses 1-15, further comprising:
    indicating a modification or release of the non-F1 type of traffic to the IAB-donor-CU; and
    receiving, from the IAB-donor-CU, an updated configuration.
17. An apparatus for wireless communication at an integrated access and backhaul (IAB) node, comprising: a memory; and a processor in communication with the memory and configured to perform the method of any of clauses 1-16.
18. An apparatus for wireless communication at an integrated access and backhaul (IAB) node, comprising means for performing the method of any of clauses 1-16.
19. A non-transitory computer-readable medium storing computer-executable instructions that, when executed by a processor of an integrated access and backhaul (IAB) node, cause the IAB-node to perform the method of any of clauses 1-16.

20. A method of wireless communication, comprising, at an integrated access and backhaul (IAB) donor-central unit (CU):

receiving, from an IAB-node having a connection with the IAB-donor-CU, an indication of a non-F1 type of traffic for backhauling between the IAB-node and the IAB-donor-CU; and providing, to the IAB-node, a configuration that maps the non-F1 type of traffic to an uplink transport channel at the IAB-node.

21. The method of clause 20, wherein the indication identifies the non-F1 type of traffic as one of: NG, S1, Xn, X2, E1, W1, N4, or Sx traffic.

22. The method of clause 20 or 21, wherein the indication includes quality of service (QoS) characteristics or a priority class of the non-F1 type of traffic.

23. The method of any of clauses 20-22, wherein the indication includes one or more internet protocol (IP) header fields for protocol data units of the non-F1 type of traffic.

24. The method of any of clauses 20-23, wherein the transport channel is a backhaul radio link control (RLC) channel.

25. The method of any of clauses 20-24, wherein the indication requests a transport channel with quality of service (QoS) characteristics or a priority class.

26. The method of any of clauses 20-25, wherein the configuration is a backhaul adaptation protocol (BAP) uplink mapping configuration.

27. The method of any of clauses 20-26, wherein the configuration maps the non-F1 type of traffic to a routing identifier.

28. The method of any of clauses 20-27, wherein the configuration includes a configuration of the transport channel from the IAB-node to the IAB-donor-CU.

29. The method of any of clauses 20-28, wherein providing the indication comprises transmitting a message via a radio resource control (RRC) protocol or the F1 connection.

30. The method of any of clauses 20-29, wherein receiving the configuration comprises receiving a message via a RRC protocol or the F1 connection.

31. The method of any of clauses 20-30, further comprising:

receiving an indication of a modification or release of the non-F1 type of traffic to the IAB-donor-CU; and transmitting an updated configuration from the IAB-donor-CU.

32. An apparatus for wireless communication at an integrated access and backhaul (IAB) donor-central unit (CU), comprising: a memory; and a processor in communication with the memory and configured to perform the method of any of clauses 20-31.

33. An apparatus for wireless communication an integrated access and backhaul (IAB) donor-central unit (CU), comprising means for performing the method of any of clauses 20-31.

34. A non-transitory computer-readable medium storing computer-executable instructions that, when executed by a processor of an integrated access and backhaul (IAB) donor-central unit (CU), cause the IAB-donor-CU to perform the method of any of clauses 20-31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising, at an integrated access and backhaul (IAB) node:

providing an IAB-donor-central unit (CU) having a connection with the IAB-node with an indication of a non-F1 type of traffic for backhauling between the IAB-node and the IAB-donor-CU; and receiving, from the IAB-donor-CU, a configuration that maps the non-F1 type of traffic to an uplink transport channel at the IAB-node.

2. The method of claim 1, wherein the indication identifies the non-F1 type of traffic as one of: NG, S1, Xn, X2, E1, W1, N4, or Sx traffic.

3. The method of claim 1, wherein the indication includes quality of service (QOS) characteristics or a priority class of the non-F1 type of traffic.

4. The method of claim 1, wherein the indication includes one or more internet protocol (IP) header fields for protocol data units of the non-F1 type of traffic.

5. The method of claim 1, wherein the indication specifies whether the non-F1 type of traffic is control plane signaling or user plane data.

6. The method of claim 1, wherein the indication specifies a direction of the non-F1 type of traffic.

7. The method of claim 1, wherein the indication specifies whether the non-F1 type of traffic is associated with a user equipment (UE) or not associated with a UE.

8. The method of claim 1, wherein the uplink transport channel is a backhaul radio link control (RLC) channel.

9. The method of claim 1, wherein the indication requests a transport channel with quality of service (QOS) characteristics or a priority class.

10. The method of claim 1, wherein the configuration is a backhaul adaptation protocol (BAP) configuration.

11. The method of claim 10, wherein the configuration is a BAP uplink mapping configuration.

12. The method of claim 1, wherein the configuration maps the non-F1 type of traffic to a routing identifier.

13. The method of claim 1, wherein the configuration includes a configuration of the uplink transport channel from the IAB-node to the IAB-donor-CU.

14. The method of claim 1, wherein providing the indication comprises transmitting a message over the connection via a radio resource control (RRC) protocol or an F1 connection.

15. The method of claim 1, wherein receiving the configuration comprises receiving a message over the connection via a RRC protocol or an F1 connection.

16. The method of claim 1, further comprising:
    indicating a modification or release of the non-F1 type of traffic to the IAB-donor-CU; and
    receiving, from the IAB-donor-CU, an updated configuration.

17. A method of wireless communication, comprising, at an integrated access and backhaul (IAB) donor-central unit (CU):
    receiving, from an IAB-node having a connection with the IAB-donor-CU, an indication of a non-F1 type of traffic for backhauling between the IAB-node and the IAB-donor-CU; and
    providing, to the IAB-node, a configuration that maps the non-F1 type of traffic to an uplink transport channel at the IAB-node.

18. The method of claim 17, wherein the indication identifies the non-F1 type of traffic as one of NG, S1, Xn, X2, E1, W1, N4, or Sx traffic.

19. The method of claim 17, wherein the indication includes quality of service (QOS) characteristics or a priority class of the non-F1 type of traffic.

20. The method of claim 17, wherein the indication includes one or more internet protocol (IP) header fields for protocol data units of the non-F1 type of traffic.

21. The method of claim 17, wherein the uplink transport channel is a backhaul radio link control (RLC) channel.

22. The method of claim 17, wherein the indication requests a transport channel with quality of service (QoS) characteristics or a priority class.

23. The method of claim 17, wherein the configuration is a backhaul adaptation protocol (BAP) uplink mapping configuration.

24. The method of claim 17, wherein the configuration maps the non-F1 type of traffic to a routing identifier.

25. The method of claim 17, wherein the configuration includes a configuration of the uplink transport channel from the IAB-node to the IAB-donor-CU.

26. The method of claim 17, wherein providing the indication comprises transmitting a message via a radio resource control (RRC) protocol or an F1 connection.

27. The method of claim 17, wherein receiving the configuration comprises receiving a message via a RRC protocol or an F1 connection.

28. The method of claim 17, further comprising:
    receiving an indication of a modification or release of the non-F1 type of traffic to the IAB-donor-CU; and
    transmitting an updated configuration from the IAB-donor-CU.

29. An apparatus for wireless communication at an integrated access and backhaul (IAB) node, comprising:
    a memory; and
    a processor in communication with the memory and configured to:
        provide an IAB-donor-central unit (CU) having a connection with the IAB-node with an indication of a non-F1 type of traffic for backhauling between the IAB-node and the IAB-donor-CU; and
        receive, from the IAB-donor-CU, a configuration that maps the non-F1 type of traffic to an uplink transport channel at the IAB-node.

30. An apparatus for wireless communication at an integrated access and backhaul (IAB)-donor-central unit (CU), comprising:
    a memory; and
    a processor in communication with the memory and configured to:
        receive, from an IAB-node having a connection with the IAB-donor-CU, an indication of a non-F1 type of traffic for backhauling between the IAB-node and the IAB-donor-CU; and
        provide, to the IAB-node, a configuration that maps the non-F1 type of traffic to an uplink transport channel at the IAB-node.

* * * * *